(12) United States Patent
Yildiz et al.

(10) Patent No.: US 10,540,812 B1
(45) Date of Patent: Jan. 21, 2020

(54) HANDLING REAL-WORLD LIGHT SOURCES IN VIRTUAL, AUGMENTED, AND MIXED REALITY (XR) APPLICATIONS

(71) Applicant: Dell Products, L.P., Round Rock, TX (US)

(72) Inventors: Yagiz Can Yildiz, Austin, TX (US); Michael S. Gatson, Austin, TX (US); Ryan Nicholas Comer, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/243,924

(22) Filed: Jan. 9, 2019

(51) Int. Cl.
| G06T 15/50 | (2011.01) |
| G06T 19/20 | (2011.01) |
| G06T 7/579 | (2017.01) |

(52) U.S. Cl.
CPC ............ G06T 15/506 (2013.01); G06T 19/20 (2013.01); *G06T 7/579* (2017.01); *G06T 2215/16* (2013.01); *G06T 2219/2012* (2013.01); *G06T 2219/2016* (2013.01)

(58) Field of Classification Search
CPC .................................................. G06T 19/006
See application file for complete search history.

(56) References Cited

U.S. PATENT DOCUMENTS

| 7,623,115 | B2 * | 11/2009 | Marks | ...................... | G06F 3/017 |
| | | | | | 345/156 |
| 10,235,797 | B1 * | 3/2019 | Sheffield | ............... | G06T 19/006 |
| 2002/0027601 | A1 * | 3/2002 | Nakayama | ........... | H04N 5/2352 |
| | | | | | 348/223.1 |
| 2013/0141434 | A1 * | 6/2013 | Sugden | ................ | G02B 27/017 |
| | | | | | 345/426 |
| 2015/0049487 | A1 * | 2/2015 | Connor | ............... | F21V 33/0076 |
| | | | | | 362/277 |
| 2015/0279113 | A1 * | 10/2015 | Knorr | .................... | G06T 19/006 |
| | | | | | 345/633 |
| 2016/0156826 | A1 * | 6/2016 | Hagiwara | ............ | H04N 5/3535 |
| | | | | | 348/221.1 |

(Continued)

OTHER PUBLICATIONS

Maciej Laskowski, "Detection of Light Sources in Digital Photographs," Jan. 2007, 6 pages, publisher Institute of Computer Graphics Technical University of Szczecin, Szczecin, Poland, retrieved Oct. 11, 2018, available at http://old.cescg.org/CESCG-2007/papers/Szczecin-Laskowski-Maciej.pdf.

(Continued)

*Primary Examiner* — Phi Hoang
(74) *Attorney, Agent, or Firm* — Fogarty LLP (57) ABSTRACT

Embodiments of systems and methods for handling real-world light sources in virtual, augmented, and mixed reality (xR) applications are described. In an illustrative, non-limiting implementation, an Information Handling System (IHS) may include a processor and a memory coupled to the processor, the memory having program instructions stored thereon that, upon execution by the processor, cause the IHS to: detect a real-world light source using a sensor mounted on a Head-Mounted Device (HMD); identify a property of the real-world light source; and indicate the property to a rendering engine during execution of an xR application, where the rendering engine is configured to render an image for display by the HMD based on the property.

17 Claims, 8 Drawing Sheets

(56) References Cited

U.S. PATENT DOCUMENTS

2016/0364914 A1* 12/2016 Todeschini ............ G06T 19/006
2019/0114828 A1*  4/2019 Trowbridge ............ G06T 15/80
2019/0172261 A1*  6/2019 Alt ........................ G06T 19/006
2019/0187779 A1*  6/2019 Miller ................... A63F 13/235

OTHER PUBLICATIONS

Masayuki Kanbara, et al., "Real-time Estimation of Light Source Environment for Photorealistic Augmented Reality," Aug. 23, 2004, 4 pages, publisher Graduate School of Information Science, Nara Institute of Science and Technology, 8916-5 Takayama-cho, Ikoma-ski, Nara 630-0192, Japan, retrieved Oct. 11, 2018, available at http://library.naist.jp/dspace/bitstream/handle/10061/11294/749_icpr04.pdf?sequence=1.

Srikrishna Jayanty, "How do I calculate Luminance of an Image in Lux measure in MATLAB?," retrieved Oct. 11, 2018, available at https://www.researchgate.net/post/How_do_I_calculate_Luminance_of_an_Image_in_Lux_measure_in_MATLAB.

Ibrahim Al-Shal, "By image processing, how can i detect the brightness or the light intensity of the camera frames?," retrieved Oct. 11, 2018, available at https://www.researchgate.net/post/By_image_processing_how_can_i_detect_the_brightness_or_the_light_intensity_of_the_camera_frames.

Simone Bianco, et al., "Single and Multiple Illuminant Estimation Using Convolutional Neural Networks," Dec. 11, 2015, 14 pages, arXiv:1508.00998v2 [cs.CV], retrieved Oct. 11, 2018, available at https://arxiv.org/pdf/1508.00998.pdf.

* cited by examiner

HANDLING REAL-WORLD LIGHT SOURCES IN VIRTUAL, AUGMENTED, AND MIXED REALITY (XR) APPLICATIONS

FIELD

The present disclosure generally relates to Information Handling Systems (IHSs), and, more particularly, to systems and methods for handling real-world light sources in virtual, augmented, and mixed reality (xR) applications.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs may be used to produce virtual, augmented, or mixed reality (xR) applications. The goal of virtual reality (VR) is to immerse users in virtual environments. A conventional VR device obscures a user's real-world surroundings, such that only digitally-generated images remain visible. In contrast, augmented reality (AR) and mixed reality (MR) operate by overlaying digitally-generated content or entities (e.g., characters, text, hyperlinks, images, graphics, etc.) upon the user's real-world, physical surroundings. A typical AR/MR device includes a projection-based optical system that displays content on a translucent or transparent surface of an HMD, heads-up display (HUD), eyeglasses, or the like (collectively "HMDs").

In various implementations, HMDs may be tethered to an external or host IHS. Most HMDs do not have as much processing capability as the host IHS, so the host IHS is used to generate the digital images to be displayed by the HMD. The HMD transmits information to the host IHS regarding the state of the user, which in turn enables the host IHS to determine which image or frame to show to the user next, and from which perspective, as the user moves in space.

SUMMARY

Embodiments of systems and methods for handling real-world light sources in virtual, augmented, and mixed reality (xR) applications are described. Embodiments of systems and methods for handling real-world light sources in virtual, augmented, and mixed reality (xR) applications are described. In an illustrative, non-limiting embodiment, an Information Handling System (IHS) may include a processor and a memory coupled to the processor, the memory having program instructions stored thereon that, upon execution by the processor, cause the IHS to: detect a real-world light source using a sensor mounted on a Head-Mounted Device (HMD); identify a property of the real-world light source; and indicate the property to a rendering engine during execution of an xR application, where the rendering engine is configured to render an image for display by the HMD based on the property.

Generally speaking, a real-world light source may include any natural or artificial light source. In some cases, the sensor may include an RGB camera, and the property may include at least one of: location, size, intensity, or color. Determining the location may include determining HMD pose derived from Simultaneous Localization and Mapping (SLAM) data. Additionally, or alternatively, determining the location may include determining a distance between the real-world light source and the HMD using a depth camera.

The program instructions may further cause the IHS to transform a real-world location of the real-world light source to a virtual location in a coordinate system used by the xR application. Additionally, or alternatively, the program instructions may further cause the IHS to classify the real-world light source as: point, spot, directional, or area. To indicate the property, the program instructions may further cause the IHS to build a look-up table (LUT) of virtual light sources by type, position, color, intensity, and size. Additionally, or alternatively, to indicate the property, the program instructions, upon execution by the processor, further cause the IHS to provide a portion of the LUT to the rendering engine using an Application Programming Interface (API).

In some cases, the program instructions, upon execution by the processor, may cause the IHS to: detect movement of the real-world light source during execution of an xR application; and update the property to reflect the movement. Additionally, or alternatively, the program instructions, upon execution by the processor, may cause the IHS to: detect a change in intensity of the real-world light source during execution of an xR application; and update the property to reflect the change in intensity.

In another illustrative, non-limiting embodiment, a method may include identifying a real-world light source using a camera mounted on an HMD; modeling the real-world light source as an artificial light source; and rendering a three-dimensional overlay image for display by the HMD, at least in part, using the artificial light source. For example, the virtual light source may model at least one of: location, size, intensity, or color, of the real-world light source. The method may also include classifying the real-world light source as: point, spot, directional, or area.

In some cases, the method may include detecting movement of the real-world light source; simulating a corresponding movement of the virtual light source; and updating an illumination of the overlay image according to the movement. The method may also include detecting a change in intensity of the real-world light source; simulating a corresponding change of intensity of the virtual light source; and updating an illumination of the overlay image according to the change in intensity. The method may also include detecting a change in color of the real-world light source; simulating a corresponding change of color of the virtual light source; and updating an illumination of the overlay image according to the change in color.

In yet another illustrative, non-limiting embodiment, a hardware memory of an HMD may have program instructions stored thereon that, upon execution by a processor, cause the HMD to: capture an image of a real-world light source during execution of an augmented reality (AR) application using a sensor mounted on an HMD; provide the image to an IHS coupled to the HMD, wherein the IHS is configured to identify a property of the real-world light source and to illuminate or shade an image rendered using the property; receive the rendered image from the IHS; and display the rendered image. To illuminate or shade the image rendered using the property, the IHS may be further configured to transform a real-world location of the real-world light source to another location in a coordinate system used by the AR application.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Embodiments described herein provide systems and methods for handling real-world light sources in virtual, augmented, and mixed reality (xR) applications. These techniques are particularly useful in xR applications that employ Head-Mounted Devices (HMDs), Heads-Up Displays (HUDs), and eyeglasses—collectively referred to as "HMDs."

Figure 1A:
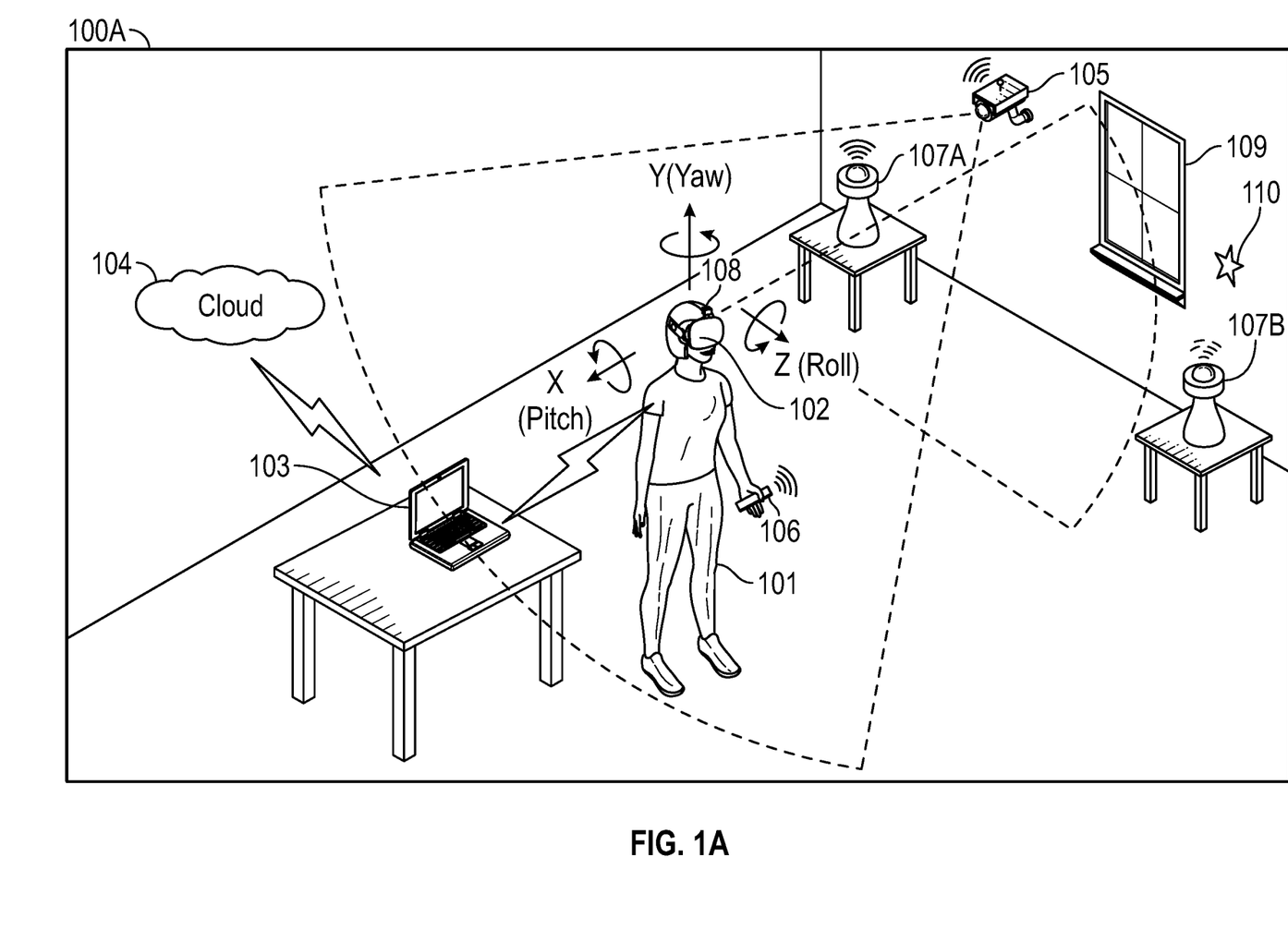
FIGS. 1A and 1B illustrate an example of an environment where a virtual, augmented, or mixed reality (xR) application may be executed, according to some embodiments.

FIG. 1A is a perspective view of an example of physical environment 100A where an xR application is executed. In various embodiments, user 101 may wear HMD 102 around their heads and over their eyes, during execution of an xR application. An xR application may include a subset of components or objects executed by HMD 102 and another subset of components or objects executed by host IHS 103.

HMD 102 may be tethered to host IHS 103 via a wired or wireless connection. Particularly, host IHS 103 may be used to generate digital images to be displayed by HMD 102. HMD 102 transmits information to host IHS 103 regarding the state of user 101 (e.g., physical position, head orientation, gaze focus, etc.), which in turn enables host IHS 103 to determine which image or frame to show to the user next, and from which perspective.

For instance, as user 101 moves about environment 100A, any change in: (i) physical location (e.g., x, y, and z) or translation; or (ii) orientation (e.g., pitch, yaw, and roll) or rotation, may cause host IHS 103 to effect a corresponding change in the picture or symbols displayed to user 101 via HMD 102. These changes may be detected by HMD 102 and processed by host IHS 103, for example, to maintain congruence with the outside world and/or to allow user 101 to look around a consistent virtual reality environment.

In some implementations, host IHS 103 may execute a runtime or rendering engine, such as UNITY, UNREAL, AUTODESK, etc., which produces a visual xR model displayed by HMD 102 from a unique point-of-view, based upon the location, pose, and/or gaze of user 101—which may be determined, at least in part, using Simultaneous Location and Mapping (SLAM).

As used herein, the term SLAM refers systems and methods that use positional tracking devices to construct a map of an unknown environment where an HMD is located, and that simultaneously identifies where the HMD is located, its orientation, and/or pose.

To enable positional tracking for SLAM purposes, HMD 102 may use wireless, inertial, acoustic, or optical sensors. And, in many embodiments, each different SLAM method may use a different positional tracking source or device. For example, wireless tracking may use a set of anchors or lighthouses 107A-B that are placed around the perimeter of environment 100A and/or one or more tokens 106 or tags 110 that are tracked; such that HMD 102 triangulates its position and/or state using those elements.

Inertial tracking may use data from accelerometers and gyroscopes within HMD 102 to find a velocity and position of HMD 102 relative to some initial point. Acoustic tracking may use ultrasonic sensors to determine the position of HMD 102 by measuring time-of-arrival and/or phase coherence of transmitted and receive sound waves.

Optical tracking may include any suitable computer vision algorithm and tracking device, such as a camera of visible, infrared (IR), or near-IR (NIR) range, a stereo camera, and/or a depth camera (IR covers a portion of the electromagnetic spectrum from approximately 0.9 μm to 14 μm). With inside-out tracking using markers, for example, camera 108 may be embedded in HMD 102, and infrared markers 107A-B or tag 110 may be placed in known stationary locations. With outside-in tracking, camera 105 may be placed in a stationary location and infrared markers 106 may be placed on HMD 102 or held by user 101. In others cases, markerless inside-out tracking may use continuous searches and feature extraction techniques from video frames obtained by camera 108 (e.g., using visual odometry) to find natural visual landmarks (e.g., window 109) in environment 100A.

In some cases, an IR or NIR SLAM camera may be further configured to capture thermographic images of target objects, and to provide accurate non-contact temperature measurements of those objects.

Figure 1B:
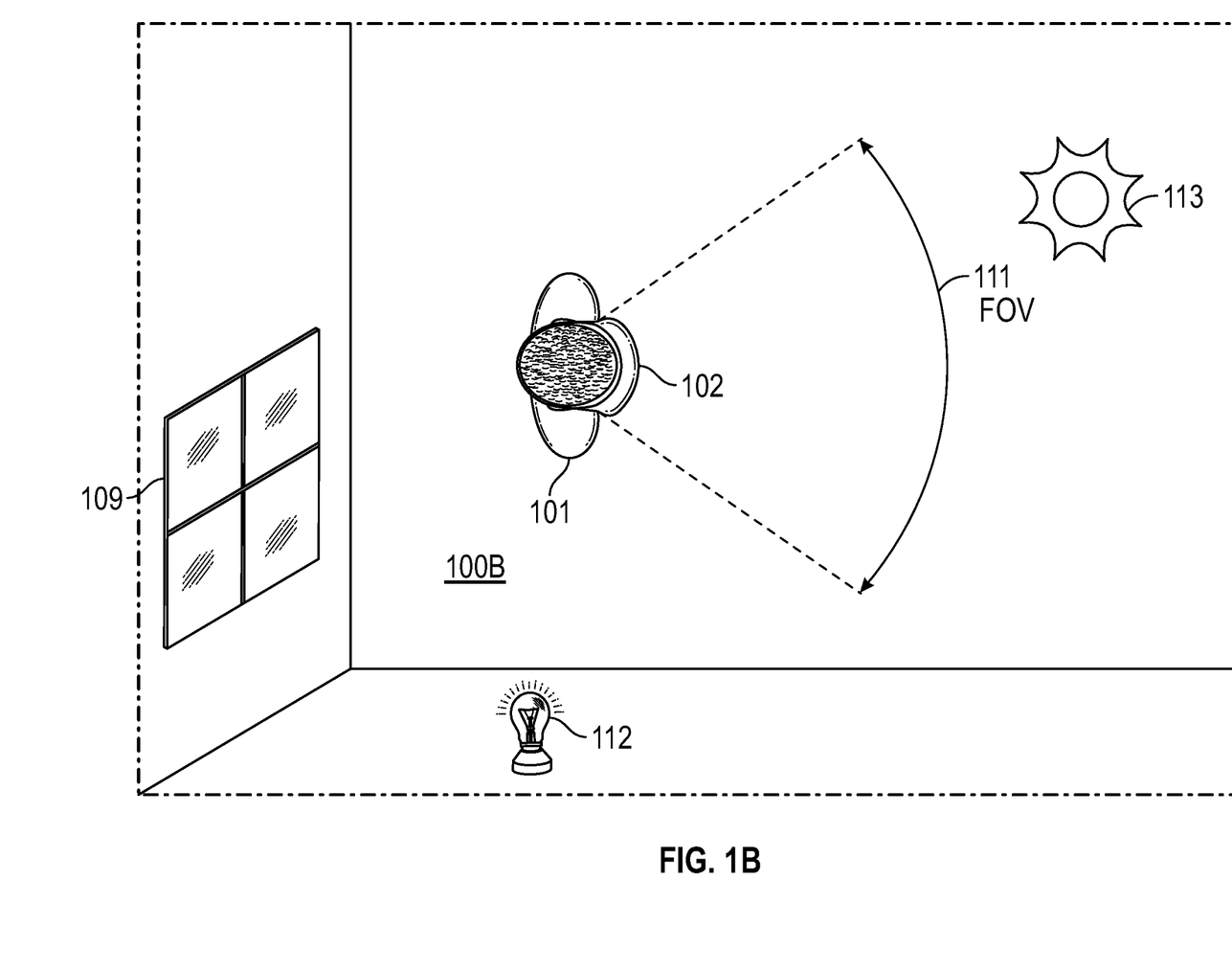

FIG. 1B shows user 101 wearing HMD 102 in real-world 100B, which may be an indoor or an outdoor space. In its current position, user 101 has field-of-vision (FOV) 111 into real-world 100B through transparent or translucent display(s) of HMD 102; yet sensors 202 mounted on HMD 102 may still have a mapping FOV of up to 360 degrees (e.g., with surround sensors and/or cameras).

In the case of an indoor space, real-world 100B may include light sources or reflectors such as window(s) 109 and light bulb 112. More broadly, however, any number of light sources or reflectors may be disposed around a room, including, floor and table lamps, ceiling fixtures, mirrors, computer displays, televisions, etc. Conversely, in the case of an outdoor space, real-word 100B may further include natural light sources or reflectors, such as astronomical bodies 113, building structures, bodies of water, etc.

In various xR applications, HMD 102 may display images overlaid upon real-world 100B, such as virtual objects (VOs), three-dimensional images, etc. Moreover, it is important that these overlaid images be naturally and/or accurately displayed by HMD 102 in a manner consistent with the user's overall visual experience. In the particular case of AR, for example, lighting conditions in terms of number of light sources, intensity and direction of lighting in real-world 100B, are different for different venues, and the conditions can change due to other factors such as time of day, and user's preferences.

To address these, and other problems, systems and methods described herein may provide realistic illumination, shading, and/or shadows to overlaid content displayed by HMD 102, in manner that is consistent with the lighting conditions of the user's physical space outside of HMD 102. For example, a software service executed by IHS 102 may identify and classify real-world light sources in an environment (e.g., with a calibration operation), create artificial light sources in a virtual world's coordinates that correspond to the real-world light sources, and periodically update the light sources as part of the rendering of virtual objects to be displayed by HMD 102. These systems and methods may periodically update light sources during the course of execution of the xR application, in response to movement, brightness, or color changes, etc.

Figure 2:
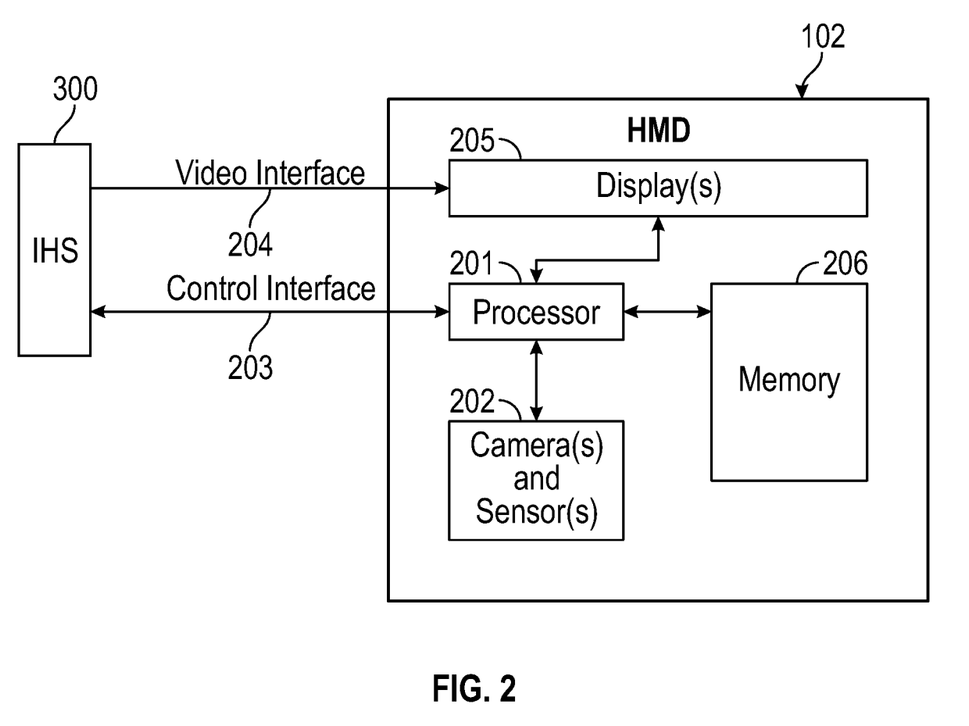
FIG. 2 illustrates an example of electronic components of a Head-Mounted Display (HMD), according to some embodiments.

FIG. 2 illustrates an example of electronic components of HMD 102. In various embodiments, HMD 102 may include number of camera(s) and/or sensor(s) 202 coupled to processor or controller 201, according to some embodiments. Examples of camera(s) 202 include, but are not limited to: inside-out cameras, outside-in cameras, eye tracking cameras, RGB cameras, gesture cameras, infrared (IR) or near-IR (NIR) cameras, SLAM cameras, etc. Meanwhile, examples of sensor(s) 202 include, but are not limited to: electric, magnetic, radio, optical, infrared, thermal, force, pressure, acoustic, ultrasonic, proximity, position, deformation, movement, velocity, rotation, gyroscopic, and/or acceleration sensor(s). In some cases, camera(s) and/or sensor(s) 202 may be coupled to processor or controller 201 via a sensor hub.

Processor or controller 201 of HMD 102 is also coupled to IHS 300 (FIG. 3) via a wired (e.g., USB) or wireless connection (e.g., Wi-Fi, Bluetooth, etc.), thus establishing control interface 203. Control interface 203 may provide forward and backward communication channels between processor 201 and IHS 300, depending upon the architecture of the xR system, to facilitate execution of an xR application. For example, program instructions stored in memory 206, when executed by processor 201, may cause frames captured by camera(s) 202 to be transmitted to IHS 300 via control interface 203.

IHS 300 may in turn execute SLAM module 403 (FIG. 4), for example, based upon landmarks found in the video frames received from HMD 102's camera(s) 108 (or from outside-in camera 105). Particularly, SLAM module 403 may be configured to implement tracking techniques that use distinctive visual characteristics of the physical environment to identify specific images or shapes which are then usable to calculate HMD 102's position and orientation. Then, rendering engine 406 (FIG. 4) may use data from SLAM module 403 to render an image to be provided to display(s) 205 via video interface 204 (e.g., High-Definition Multimedia Interface or "HDMI," Digital Visual Interface or "DVI," DISPLAYPORT, etc.).

Video interface 204 may drive both a right and left display 205 (one for each eye), in order to provide a 3-D or stereoscopic view. In some cases, video interface 204 may include two separate video interfaces, one for each display 205. Additionally, or alternatively, a single interface that supports multi-stream may be used to drive both displays 205.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

Figure 3:
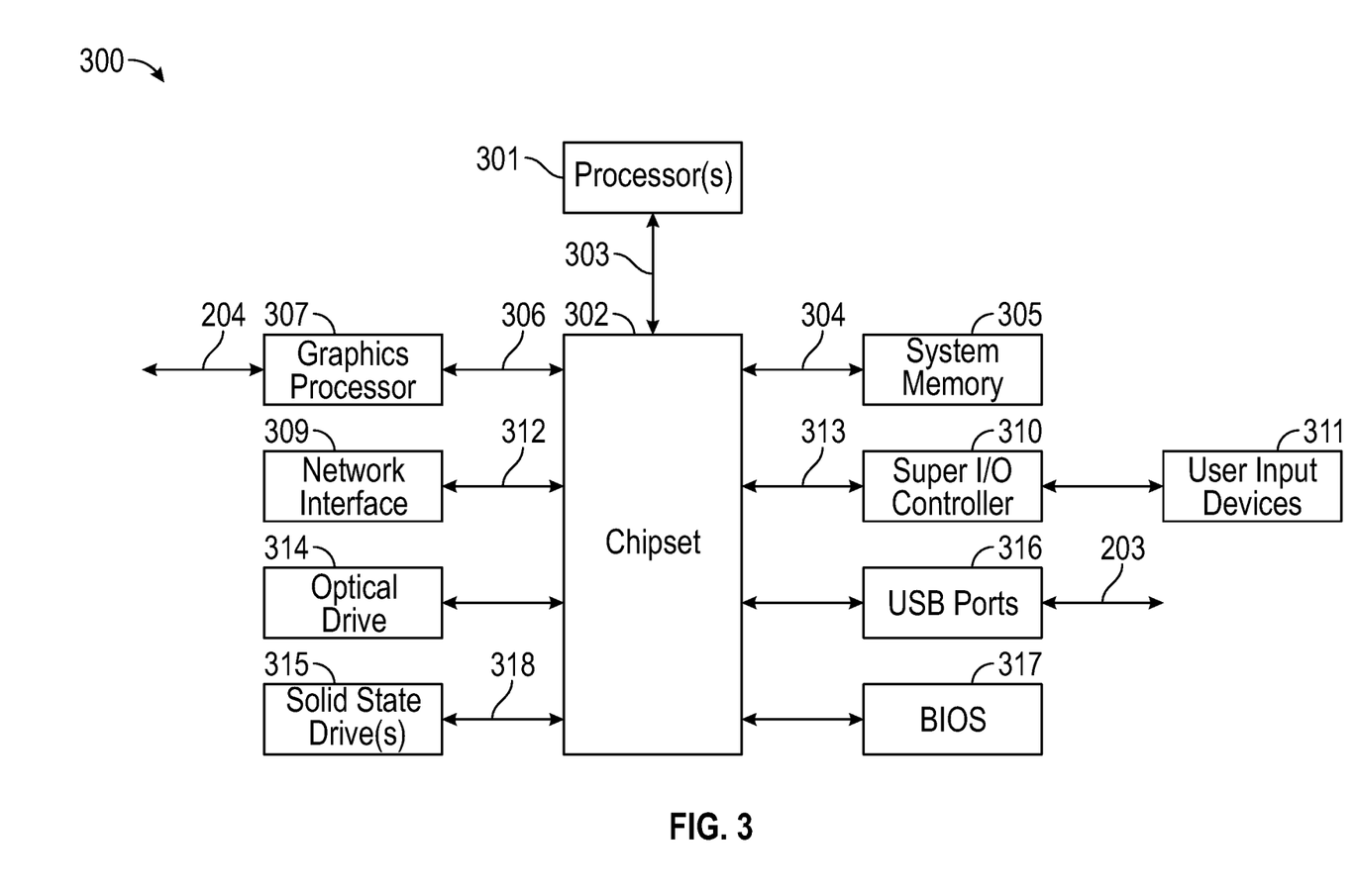
FIG. 3 illustrates an example of electronic components of an Information Handling System (IHS), according to some embodiments.

FIG. 3 is a block diagram of IHS 300 configured to implement host IHS 103, according to certain embodiments. As shown, IHS 300 may include one or more processors 301. In various implementations, IHS 300 may be a single-processor system including one processor 301, or a multi-processor system including two or more processors 301. Processor(s) 301 may include any processor capable of executing program instructions, such as an Intel Pentium™ series processor or any general-purpose or embedded processors having any of a variety of Instruction Set Architectures (ISAs), such as the x86, POWERPC®, ARM®, SPARC®, or MIPS® ISAs, or any other suitable ISA.

IHS 300 includes chipset 302 that may include one or more integrated circuits that are connect to processor(s) 301. In certain embodiments, chipset 302 may utilize QuickPath Interconnect (QPI) bus 303 for communicating with the processor(s) 301. Chipset 302 provides the processor(s) 301 with access to a variety of resources. For instance, chipset 302 provides access to system memory 305 over memory bus 304. System memory 305 may be configured to store program instructions and/or data accessible by processors(s) 301. In various embodiments, system memory 305 may be implemented using any suitable memory technology, such as static RAM (SRAM), dynamic RAM (DRAM) or nonvolatile/Flash-type memory.

Chipset 302 may also provide access to graphics processor 307. In certain embodiments, graphics processor 307 may be comprised within one or more video or graphics cards that have been installed as components of IHS 300. Graphics processor 307 may be coupled to the chipset 302 via a graphics bus 306 such as provided by an Accelerated Graphics Port (AGP) bus or a Peripheral Component Interconnect Express (PCIe) bus. In certain embodiments, graphics processor 307 generates display signals and provides them to HMD device 102 via video interface 204.

In certain embodiments, chipset 302 may also provide access to one or more user input devices 311. In such embodiments, chipset 302 may be coupled to a super I/O controller 310 that provides interfaces for a variety of user input devices 311, in particular lower bandwidth and low data rate devices. For instance, super I/O controller 310 may provide access to a keyboard and mouse or other peripheral input devices. In certain embodiments, super I/O controller 310 may be used to interface with coupled user input devices 311 such as keypads, biometric scanning devices, and voice or optical recognition devices, through wired or wireless connections. In certain embodiments, chipset 302 may be coupled to the super I/O controller 310 via a Low Pin-Count (LPC) bus 313.

Other resources may also be coupled to the processor(s) 301 of IHS 300 through the chipset 302. In certain embodiments, chipset 302 may be coupled to a network interface 309, such as provided by a Network Interface Controller (NIC) that is coupled to IHS 300. In certain embodiments, the network interface 309 may be coupled to the chipset 302 via a PCIe bus 312. According to various embodiments, network interface 309 may support communication via various wired and/or wireless networks. In certain embodiments, the chipset 302 may also provide access to one or more Universal Serial Bus (USB) ports 316; which in some implementations may serve as transport for establishing control interface 203 with HMD 102.

Chipset 302 also provides access to one or more solid-state storage devices 315. The chipset 302 utilizes a PCIe bus interface connection 318 in order to communication with the solid-state storage device 315. In certain embodiments, chipset 302 may also provide access to other types of storage devices. For instance, in addition to the solid-state storage device 315, an IHS 300 may also utilize one or more magnetic disk storage devices, or other types of the storage devices such as an optical drive or a removable-media drive. In various embodiments, the solid-state storage device 315 may be integral to IHS 300, or may be located remotely from IHS 300.

Another resource that may be accessed by processor(s) 301 via chipset 302 is a Basic Input/Output System (BIOS) 317. As described in more detail below with respect to additional embodiments, upon powering or restarting IHS 300, processor(s) 301 may utilize BIOS 317 instructions to initialize and test hardware components coupled to IHS 300 and to load an operating system for use by IHS 300. BIOS 317 provides an abstraction layer that allows the operating system to interface with certain hardware components that are utilized by IHS 300. Via this hardware abstraction layer provided by BIOS 317, the software executed by the processor(s) 301 of IHS 300 is able to interface with certain I/O devices that are coupled to IHS 300. As used herein, the term "BIOS" is intended to also encompass Unified Extensible Firmware Interface (UEFI).

In various embodiments, HMD 102 and/or host IHS 103 may not include each of the components shown in FIGS. 2 and 3, respectively. Additionally, or alternatively, HMD 102 and/or host IHS 103 may include various components in addition to those that are shown in FIGS. 2 and 3. Furthermore, some components that are represented as separate components in FIGS. 2 and 3 may, in some embodiments, be integrated with other components. For example, in various implementations, all or a portion of the functionality provided by the illustrated components may instead be provided by components integrated into the one or more processor(s) as a system-on-a-chip (SOC) or the like.

Figure 4:
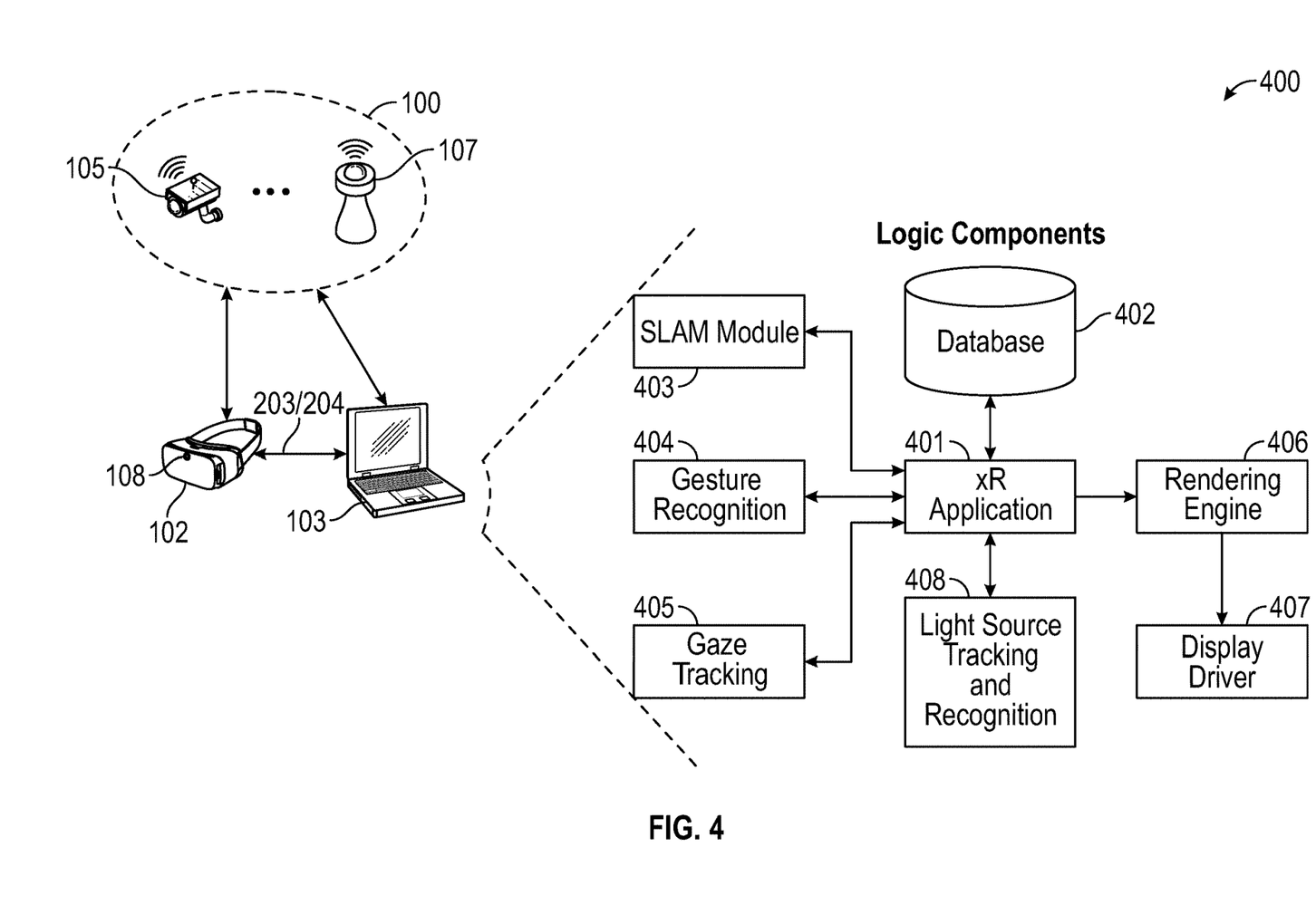
FIG. 4 illustrates an example of logic components of an xR application, according to some embodiments.

FIG. 4 illustrates logic components 400 of xR application 401. In various embodiments, logic components 400 may be executed by IHS 103 and/or HMD 102, such that sub-parts of each of logic components 400 may run on processor 201 of HMD 102 and/or 301 of IHS 103. Moreover, program instructions implementing logic components 400 may be stored in memory 206 of HMD 102 and/or memory 305 of IHS 103.

Generally speaking, xR application 401 may include any xR application now existing or yet to be developed, including, but not limited to: entertainment, video games, robotics, healthcare, education and training, military uses, occupational safety, engineering, industrial or product design, collaboration applications, virtual meetings, etc. Moreover, any data required or otherwise used during operation of xR application 401 may be stored in database 402, discussed in more detail below.

SLAM module 403 uses positional tracking devices to construct a map of an unknown environment where HMD 102 is located, which simultaneously identifies where the HMD is located, its orientation, and/or pose. Generally, SLAM module 403 may include a propagation component, a feature extraction component, a mapping component, and an update component. The propagation component may receive angular velocity and accelerometer data from an Inertial Measurement Unit (IMU) built into HMD 102, for example, and it may use that data to produce a new HMD position and/or pose estimation. A camera (e.g., a depth-sensing camera) may provide video frames to the feature extraction component, which extracts useful image features (e.g., using thresholding, blob extraction, template matching, etc.), and generates a descriptor for each feature. These features, also referred to as "landmarks," are then fed to the mapping component.

The mapping component may be configured to create and extend a map, as HMD 102 moves in space. Landmarks may also be sent to the update component, which updates the map with the newly detected feature points and corrects errors introduced by the propagation component. Moreover, the update component may compare the features to the existing map such that, if the detected features already exist in the map, the HMD's current position may be determined from known map points.

An estimator, such as an Extended Kalman filter (EKF), may be used for handling the propagation component of an inside-out SLAM method. A map may be generated as a vector stacking sensors and landmarks states, modeled by a Gaussian variable. The map may be maintained using predictions (e.g., when HMD 102 moves) and/or corrections (e.g., camera 108 observes landmarks in the environment that have been previously mapped). In other cases, a map of environment 100A may be obtained, at least in part, from cloud 104.

For example, HMD 102 may capture IR/NIR frames (e.g., from camera 108), perform image pre-processing operations, generate object detection of landmarks using feature extraction techniques, and send SLAM data (e.g., pixel values for each pixel in the ROI, along with IR/NIR frame data, coordinates of detected landmarks, etc.) to host IHS 103. Host IHS 103 may perform EKF operations for each detected landmark and it may calculate a Kalman Gain (G) for each landmark (L), which in turn indicates a confidence or probability of the landmark's measured location being accurate.

Gesture recognition module 404 may also use one or more cameras or optical sensors 202 that enable user 101 to use their actual hands for interaction with virtual objects (VOs) rendered by display 205 within HMD 102. For example, gesture recognition module 404 may be configured to implement hand tracking and gesture recognition in a 3-D space via a user-facing 2-D camera. In some cases, gesture recognition module 404 may track a selectable number of degrees-of-freedom (DOF) of motion, with depth information, to recognize dynamic hand gestures (e.g., swipes, clicking, tapping, grab and release, etc.) usable to control or otherwise interact with xR application 401.

Generally, gesture detection begins when video frame data (e.g., a video or depth-video stream) is received at host IHS 103 from gesture or RGB camera 108 of HMD 102. In some implementations, video data may have already been processed, to some degree, by processor 201 of HMD 102. Then, the video data is further processed to control aspects of xR application 401, by identifying various gestures and sequences that constitute user input.

At least a portion of the user's body may be identified in the video frame data obtained using gesture or RGB camera 108. For example, through image processing, a given locus of a video frame or depth map may be recognized as belonging to user 101. Pixels that belong to user 101 (e.g., arms, hands, fingers, etc.) may be identified, for example, by sectioning off a portion of the video frame or depth map that exhibits above-threshold motion over a suitable time scale, and attempting to fit that section to a geometric model of user 101. If a suitable fit is achieved, then pixels in that section may be recognized as those of user 101.

Gesture recognition module 404 may be configured to analyze pixels of a video frame or depth map that correspond to user 101, in order to determine what part of the user's body each pixel represents. A number of different body-part assignment techniques may be used. In an example, each pixel of the video frame or depth map may be assigned a body-part index. The body-part index may include a discrete identifier, confidence value, and/or body-part probability distribution indicating the body part or parts to which that pixel is likely to correspond.

For example, machine learning may be used to assign each pixel a body-part index and/or body-part probability distribution. Such a machine learning method may analyze a user with reference to information learned from a previously trained collection of known gestures and/or poses stored in a calibration database. During a supervised training phase, for example, a variety of gesture sequences may be observed, and trainers may provide label various classifiers in the observed data. The observed data and annotations may then be used to generate one or more machine-learned algorithms that map inputs (e.g., observation data from a depth camera) to desired outputs (e.g., body-part indices for relevant pixels).

Thereafter, a partial virtual skeleton may be fit to at least one body part identified. In some embodiments, a partial virtual skeleton may be fit to the pixels of video frame or depth data that correspond to a human arm, hand, and/or finger(s). A body-part designation may be assigned to each skeletal segment and/or each joint. Such virtual skeleton may include any type and number of skeletal segments and joints, including each individual finger).

In some embodiments, each joint may be assigned a number of parameters, such as, for example, Cartesian coordinates specifying joint position, angles specifying joint rotation, and other parameters specifying a conformation of the corresponding body part (e.g., hand open, hand closed, etc.). Skeletal-fitting algorithms may use the depth data in combination with other information, such as color-image data and/or kinetic data indicating how one locus of pixels moves with respect to another. Moreover, a virtual skeleton may be fit to each of a sequence of frames of depth video. By analyzing positional change in the various skeletal joints and/or segments, certain corresponding movements that indicate predetermined gestures, actions, or behavior patterns of user 101 may be identified.

Examples of one and two-handed gestures that may be recognized or tracked by gesture recognition module 404 include, but are not limited to: gestures for selecting and deselecting VOs, gestures for manipulating selected VOs (e.g., rotation and/or translation following the user's hand direction, position, and/or location), gestures for performing menu operations such as opening, closing, and/or repositioning (again, with menu rotation and/or translation following the user's hand), and gestures for manipulating applications, windows, or workspaces (e.g., using downward or upward swiping hand motion), among many others.

As used, herein, the term "minimize" or "minimizing" refers to the act of removing a window, object, application, or workspace from a main display area, collapsing it into an icon, caption, or placeholder. Conversely, the term "maximize" or "maximizing" refers to the act of displaying or expanding a window, object, application, or workspace to fill a main display area, for example, in response to user's selection of a corresponding icon, caption, or placeholder.

In other embodiments, the use of a virtual skeleton may not be necessary. For example, in other implementations, raw point-cloud data may be sent directly to a feature extraction routine within a gesture recognition module.

Gaze tracking module 405 may use an inward-facing projector, configured to create a pattern of infrared or (near-infrared) light on the user's eyes, and an inward-facing camera configured to take high-frame-rate images of the eyes and their reflection patterns; which are then used to calculate the user's eye's position and gaze focus or point. In some cases, gaze tracking module 405 may be configured to identify a direction, extent, and/or speed of movement of the user's eyes in real-time, during execution of an xR application (e.g., a gaze vector). In addition, gaze tracking module 405 may be configured to calculate a region-of-interest of configurable size or shape (e.g., circular, rectangular, etc.), based in part upon the gaze vector.

In various implementations, gaze tracking module 405 may use, among camera(s) and/or sensor(s) 202, NIR light sources to produce glints on the surface of the cornea of the user's eye, and then it may capture images of the eye region using an inward-facing camera. Gaze tracking module 405 may estimate the user's gaze from the relative movement between the pupil center and glint positions. Particularly, an eye and/or gaze tracking algorithm may perform corneal reflection-based calculations that use NIR illumination to estimate the gaze direction or the point of gaze using polynomial functions, or a geometrical model of the human eye.

To perform gaze estimation, gaze tracking module 405 may estimate the visual axis and kappa angle of the user's eye, for each user, as part of a calibration operation. Calibration may be performed by showing the user a set of visual targets distributed over the HMD's display, and the user may be asked to gaze at them for a certain amount of time. The inward-facing camera may capture the various eye positions for each target point, which are then mapped to corresponding gaze coordinates.

In some cases, gaze tracking module 405 may be configured to compensate for head movement. For example, a mathematical formula indicating the correspondence of eye gaze with head positions may represent a relationship between user reference gaze directions, head pose direction, and actual gaze direction; which is a result of both head and eye rotation.

In various embodiments, gaze tracking module 405 may perform any of a plurality of different EGT methods. For example, in two-dimensional (2D) regression-based EGT methods, a vector between the pupil center and a corneal glint may be mapped to corresponding gaze coordinates on the frontal screen using a polynomial transformation function. Conversely, three-dimensional (3D)-based EGT methods may use a geometrical model of the human eye to estimate the center of the cornea, optical and visual axes of the eye, and to estimate the gaze coordinates as points of intersection where the visual axes meets the scene.

As such, in various embodiments, gaze tracking module 405 may produce collect, measure, and/or produce information about a user's intent, cognitive processes, and behavior, based upon the user's eye movements, that may include, but is not limited to: (A) Fixations: phases when the eyes are stationary between movements and visual input occurs (e.g., total fixation duration, mean fixation duration, fixation spatial density, number of areas fixated, fixation sequences and fixation rate); (B) Saccades: rapid and involuntary eye movements that occur between fixations (e.g., saccade number, amplitude and fixation-saccade ratio); (C) Scanpath: a series of short fixations and saccades alternating before the eyes reach a target location on the screen (e.g., scanpath direction, duration, length and area covered); (D) Gaze duration: a sum of all fixations made in an area of interest before the eyes leave that area and also the proportion of time spent in each area; and/or (E) Pupil size and blink: measures used to study cognitive workload.

Based upon the foregoing, gaze tracking module 405 may be configured to follow the user's gaze direction for natural exploration of a visual scene by capturing the user's visual perspective. Moreover, gaze tracking module 405 may also be configured to estimate user gaze and blink-state for interacting with the xR environment; several types of eye movements and gestures, such as saccades, smooth pursuit and nod-roll may be used. For example, gaze tracking module 405 may be configured to use gaze, dwell time, and half-blink information for the purpose of hands-free object selection. Multiple input parameters may be used to avoid accidental selection of items. Pupil motion may be tracked to estimate a user's viewing point, with Kalman filtering to minimize pupil jitter and drifts.

Rendering engine 406 may include any engine (e.g., UNITY, UNREAL, AUTODESK, etc.) configured to render an xR model or virtual space displayed by HMD 102 from user 101's unique point-of-view based upon the user's coordinate location (e.g., from SLAM module 403), the user's pose (e.g., from an IMU), and/or the user's gaze (e.g., from gaze tracking module 405). Display driver 407 is coupled to rendering engine 406 and configured to convert rendered video frames to a display format that HMD 102 can reproduce before the user's eyes.

Source Tracking and Recognition (STAR) module 408 may implement any light source detection, modeling, identification, and/or tracking technique based on visual images, including, but not limited to: edge detection, corner detection, blob detection, ridge detection, or the like. STAR module 408 may operate with xR application 401 to track the position or movement of light sources in real-time, or near real-time using SLAM landmarks. Moreover, STAR module 408 may be configured to provide a software service described in FIG. 5.

Database 402 may include a look-up table (LUT) or the like, with real-world light sources and their attributes, such as: location, size, intensity, color, color temperature, flicker, and type (e.g., point, spot, directional, area, etc.). Database 402 may also include information regarding artificial light sources generated based upon these real-world light sources, and the information may be usable by rendering engine 406 to dynamically illuminate and/or shade images and objects. It should be noted, however, that light source classification need not be based only on the aforementioned attributes, and that in other cases other attributes may be used.

As used herein, the terms "transformation matrix" or "transform matrix" refer to matrices that determine how objects move around in space. For example, in some cases a transform matrix may be a 4×4 matrix that defines a transformation when applied to objects: translation, rotation and scaling. Translating an object moves it in space, rotating turns an object around its center, and scaling changes the size of an object. To apply a transform to a 3D object, such as a VO, every vertex in the 3D object may be multiplied by the transformation matrix.

When rendering engine 406 is operating, it needs to know where to place the "view camera" (i.e., the point of view for the render) in a given scene, which is done using a view matrix. For example, in some cases a view matrix may be a 4×4 matrix that contains information about the position and orientation of a viewing camera. Every vertex in the scene or frame may be multiplied the view matrix and the scene is rendered by HMD 102 (although the view matrix says how everything else in the scene should change to reflect the point of view of the camera, the camera itself does not move).

The inverse of the view matrix is referred to as the camera transform matrix, which describes how camera 108 itself moves around a scene or frame. That is, the camera transform matrix provides the position and rotation of camera 108.

To illustrate the distinction between a transform matrix and a view matrix, consider a scene that starts with camera 108 looking directly at a chair that is positioned in front of it. The user then turns the camera 45 degrees to the right (a). In this case the camera transform matrix would be a rotation matrix that indicates a 45-degree rotation to the right. The view matrix, however, would be a rotation matrix that indicates 45-degree rotation to the left around the camera's position. In another scene, if the user turns to the left and walks forward, the camera transform matrix would be a rotation matrix to the left followed by a translation matrix forward, which indicates how the user moved in the frame.

For example, if the user looks to the right (and HMD 102 turns right), the camera transform matrix obtained from SLAM sensor data may include a rotation to the right. If the user looks to the left (and HMD 102 turns left), the camera transform matrix obtained from SLAM sensor data may include a rotation to the left. If the user looks up (and HMD 102 turns upward), the camera transform matrix obtained from SLAM sensor data may include a rotation upward. And if the user looks down (and HMD 102 turns downward), the camera transform matrix obtained from SLAM sensor data may include a rotation downward. More generally, rotations around any axis may be performed by taking a rotation around the x axis, followed by a rotation around the y axis, and followed by a rotation around the z axis—such that any spatial rotation can be decomposed into a combination of principal rotations. Moreover, if HMD 102 moves forward, backward, or sideways, the camera transform matrix obtained from SLAM sensor data also reflects the resulting translation.

The term "virtual space," for xR application 401, refers to a coordinate system that defines where everything is located inside an xR application. In some cases, one or more of the aforementioned matrices may be used to perform a geometric alignment of the real-world and virtual space coordinates in real-time, and vision-based tracking or registration may be used to estimate the position and orientation of user's viewpoint using camera(s) and/or sensor(s) 202 mounted on HMD 102. As such, each real-world light object detected by STAR module 408 may be reproduced or modeled as an artificial light source in X, Y and Z coordinates relative to an origin in the virtual space.

Figure 5:
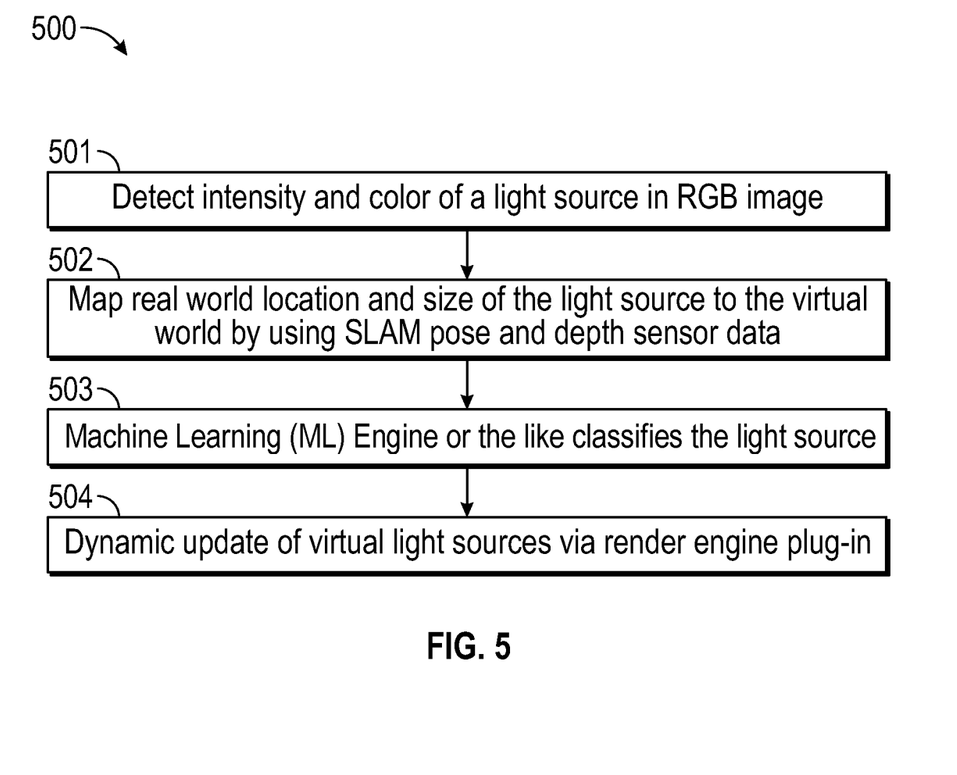
FIG. 5 illustrates an example of a software service for handling real-world light sources, according to some embodiments.

FIG. 5 illustrates an example of software service 500 for handling real-world light sources. In some embodiments, sensors 202 including RGB camera(s), IR camera(s), and/or depth sensor(s) may pass data to software service 500. Software service 500 determines real-world light sources and instantiates corresponding artificial/virtual light sources, configures new light sources, and/or updates previously instantiated light sources. This information is passed on to render engine 406 using an Application Programming Interface (API) or the like.

At block 501, service 500 detects the intensity (e.g., brightness, luminance, etc.) and color of a real-world light source detected in an RGB image obtained via camera 108. Service 500 may use an RGB camera feed to determine light intensity in regions of image, and/or color of light in regions of image. At block 502, service 500 maps the real-world location and size of the real-world light source to the virtual space, for example, using IMU sensor information that indicates the HMD's pose, position and/or orientation, and/or depth sensor information that indicates distance of the light source from HMD 102. Using that information along with a 2D size estimation from a corresponding RBG image, block 502 also determines a size of the light source.

Using these sensors, service 500 is able to determine the location, intensity, size and color of real-world light sources in the environment. Images from the RGB cameras are sent through a processing step where regions of bright color are identified as potential light sources. The pixel color in these regions are used to determine the light source color. After the regions of interest are determined, the depth image from the depth sensor can be used to find the distance to the light source. Depth readings in the region of interest may be used to find the approximate distance from HMD 102 to the light source. Finally, this distance is used with the user's position known from SLAM to determine the location of the real-world light source with respect to the user 101.

At block 503, service 500 may use a machine learning (ML) engine or the like to classify the real-world light source as one of a plurality of available types based upon the source's detected features. For example, an ML engine may classify light sources as: (i) point, a light source that emits light in all directions from a single point in space; (ii) spot, a light source that emits light in a cone from a single point in space; (iii) directional, a light source that emits light in a certain direction across the entire scene (e.g., the sun); or (iv) area, a light source that emits light from one side of a rectangular surface (e.g., a TV/monitor screen). In other embodiments, however, other types of light source classifications may be used.

In operation, an ML engine may be trained on images that are labeled as being of a certain type. The images gathered by the front-facing camera are sent through a pre-processing module to extract features for the ML engine. The ML engine learns what features correspond to what labels, which enables the classifier to predict the class of future light sources. Features that are extracted from the images may include: the outline of the light source, shape, light intensity, perceived direction/angle, light color, distance from the light source, etc. For example, the difference between a point light and directional light is that the directional light only emits light in a directional cone, while the point light emits light in all directions. The directional light appears smaller because it has a smaller angle of emission. An ML engine may be configured to learn this association to distinguish between point and directional lights.

In some cases, a convolutional neural network may be used to determine the color of light sources by observing how objects in the scene are lit. The observed color of objects in the image may be dependent on the intrinsic color of the object, how reflective the object is, illuminance from light sources and relative position of the object to light sources. A similar approach may be used to determine light type, where directionality of light sources are determined by observing the other objects around. Using the same comparison of point vs. directional light, a point light may illuminate every object around itself the same way with less light given to farther away objects. A directional light may only illuminate objects that fall within the directional cone of the light source. During data training, the neural network learns that objects behind the directional light are not illuminated and during inference, it will therefore classify the light source as a directional light. At block 504, service 500 dynamically updates artificial/virtual light sources via a render engine API.

Figure 6:
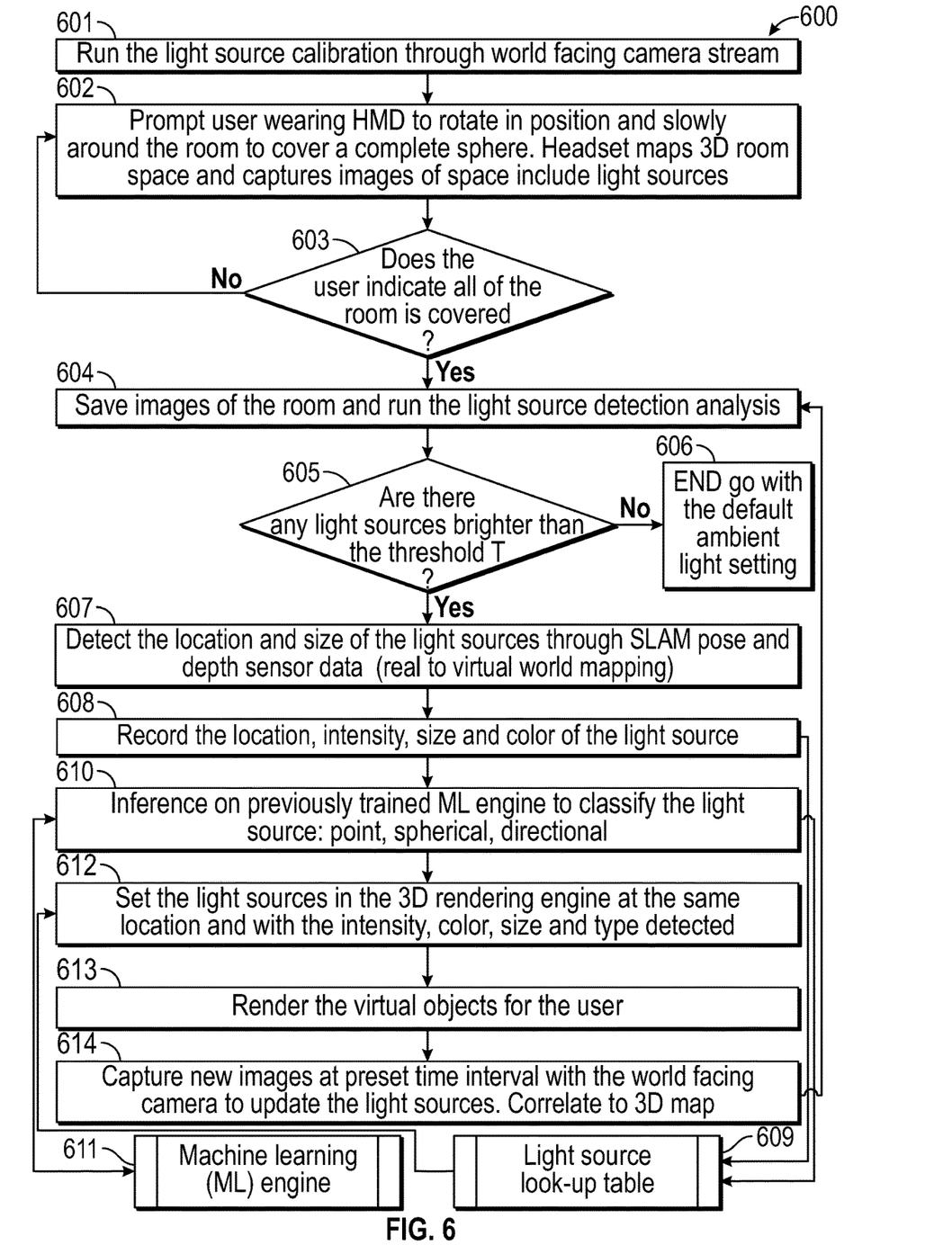
FIG. 6 illustrates an example of a method for handling real-world light sources in xR applications, according to some embodiments.

FIG. 6 illustrates an example of method 600 for handling real-world light sources in xR applications. In some embodiments, method 600 may be performed by xR application 401 in cooperation with SLAM module 403, rendering engine 406, and STAR module 408. During execution of xR application 401, HMD 102 transmits camera and sensor data to IHS 103 via control interface 203. IHS 103 transmits encoded packetized rendered content (e.g., audio-video) to HMD 102 via video interface 204. As part of this process, STAR module 408 may perform one or more operations to handle real-world light sources in the xR application.

In various implementations, blocks 601-608 may be part of a calibration procedure, and blocks 609-613 may be part of steady-state operation of method 600. At block 601, method 600 may begin calibration using images received from camera 108 mounted on HMD 102, for example. At block 602, method 600 may prompt user 101 wearing HMD 102 to rotate in position around the entire room, to cover an entire spherical area. HMD 102 maps the room space in three dimensions, and captures images of the space that include real-world light sources 109, 112, and/or 113. In some cases, block 603 may return control to block 602 until user 101 indicates that the entire room has been covered.

Block 604 saves the images received from camera 108 and performs light source detection in those images. For example, after reading an image frame, block 604 may transform RGB channels into luminance for each pixel. Next, block 604 searches the image for local maximums with a Monte-Carlo method. Block 604 selects the point with largest luminance from the set, and the process may be repeated several times. Then, block 604 finds a group of points that belong to a single area source of light.

Block 605 determines whether there are any light sources brighter than a threshold value T. If not, method 600 ends at block 606 and rendering engine 406 uses default settings for shading or illumination purposes. Otherwise, block 607 detects the location and size of the light sources using SLAM pose and depth sensor data to transform real-world coordinates into virtual space coordinates. Block 608 models and records the physical location, intensity, size, and color of the real-world light source, in real-world coordinates as well as in virtual space coordinates, for example as a light source LUT 609 in database 402.

At block 610, method 600 uses ML engine 611 (e.g., within STAR module 408) to further classify the light sources modeled in LUT 609 as being of a particular type, such as, for example: point, spherical, or directional. The type of light source may also be stored in LUT 609 for later use by rendering engine 406 in simulating an artificial light source corresponding to the detected real-world light source.

At block 612, method 600 sets one or more artificial or virtual light sources in rendering engine 406 with the same location, intensity, color, size, and type detected in the real-world light source using the engine's API. At block 613, method 600 renders an image (e.g., a three-dimensional overlay) to be displayed by HMD 102 using the artificial or virtual light source to create an illumination or shading effect consistent with that of other objects in real-world visible from inside of HMD 102. Block 614 captures new images with camera 108 at predetermined intervals and/or in real-time to update changes to the real-world light sources (movement, intensity, color, etc.).

Figure 7A:
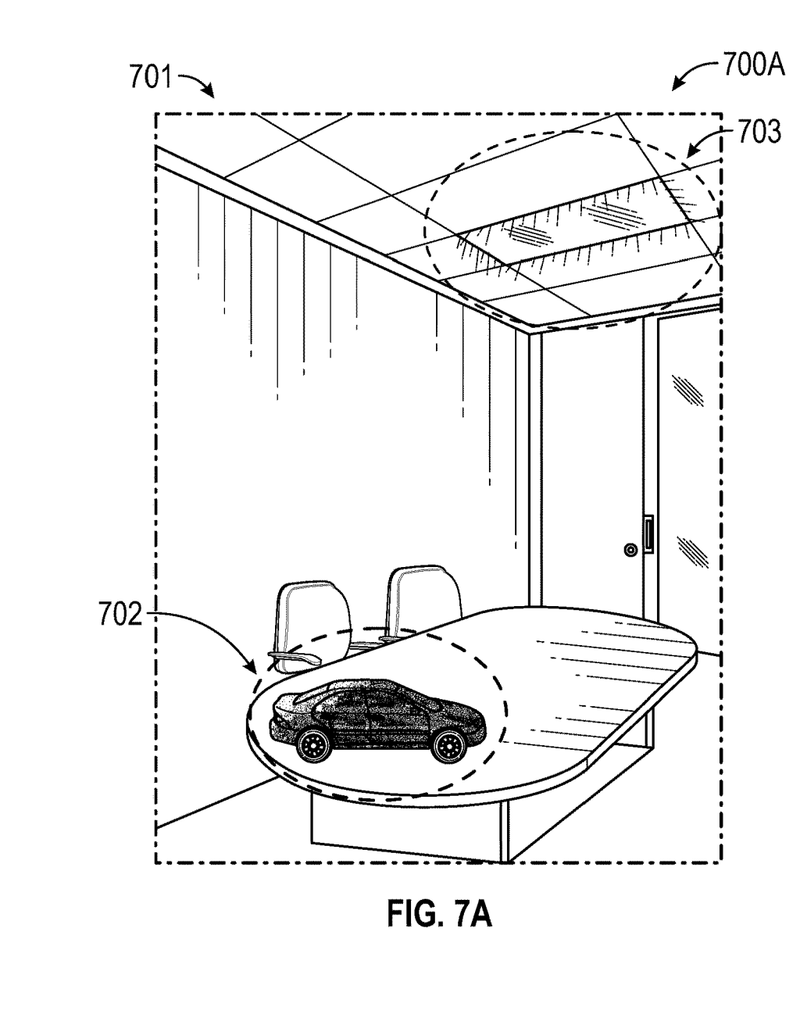
FIGS. 7A-C illustrate example use-cases, according to some embodiments.
Figure 7B:
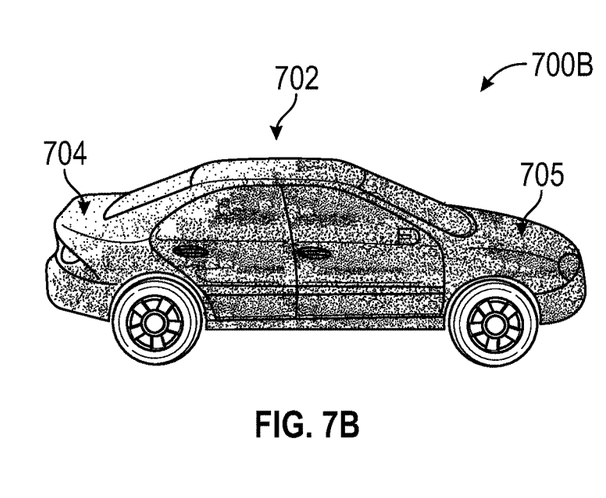
Figure 7C:
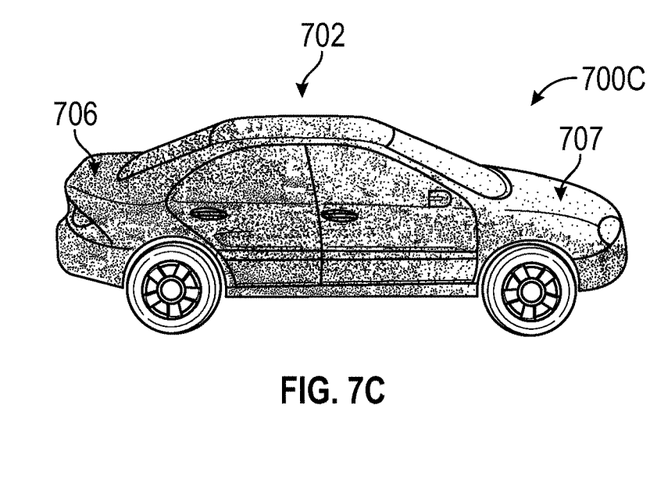

FIGS. 7A-C illustrate example use-cases of method 600. Particularly, FIG. 7A shows FOV 700A that a wearer of HMD 102 may have through its display, with real-world 701 and real-world light source 703 located on the upper right portion of the room. In this case, three-dimensional object 702 may be rendered on the display, overlaying real-world 701. FIG. 7B shows unrealistic lighting/shading results 700B in the absence of application of method 600, such that the rear portion 704 of object 702 is brighter than front portion 705—despite real-world light source 703 being on the upper right portion of the user's FOV. With application of method 600 in FIG. 7C, however, realistic lighting/shading results 700C show a shaded rear portion 706 and brighter front portion 707, in a manner consistent with the position, type, size, intensity, color, and/or movement of real-world light source 703.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory having program instructions stored thereon that, upon execution by the processor, cause the IHS to:
  detect a real-world light source using a sensor mounted on a Head-Mounted Device (HMD);
  identify a property of the real-world light source; and
  indicate the property to a rendering engine during execution of a virtual, augmented, or mixed reality (xR) application, at least in part, by providing at least a portion of a look-up table (LUT) of virtual light sources comprising type, position, color, intensity, and size using an Application Programming Interface (API), wherein the rendering engine is configured to render an image for display by the HMD based on the property.

2. The IHS of claim 1, wherein the real-world light source comprises a natural or artificial light source.

3. The IHS of claim 1, wherein the sensor comprises an RGB camera.

4. The IHS of claim 1, wherein the property comprises at least one of: location, size, intensity, or color.

5. The IHS of claim 4, wherein determining the location further comprises determining HMD pose derived from Simultaneous Localization and Mapping (SLAM) data.

6. The IHS of claim 4, wherein determining the location further comprises determining a distance between the real-world light source and the HMD using a depth camera.

7. The IHS of claim 1, wherein the program instructions, upon execution by the processor, further cause the IHS to transform a real-world location of the real-world light source to a virtual location in a coordinate system used by the xR application.

8. The IHS of claim 1, wherein the program instructions, upon execution by the processor, further cause the IHS to classify the real-world light source as: point, spot, directional, or area.

9. The IHS of claim 1, wherein the program instructions, upon execution by the processor, further cause the IHS to:
  detect movement of the real-world light source during execution of a virtual, augmented, or mixed reality (xR) application; and
  update the property to reflect the movement.

10. The IHS of claim 1, wherein the program instructions, upon execution by the processor, further cause the IHS to:
  detect a change in an attribute of the real-world light source during execution of a virtual, augmented, or mixed reality (xR) application; and
  update the property to reflect the change in the attribute.

11. A method, comprising:
identifying a real-world light source using a camera mounted on a Head-Mounted Device (HMD);
modeling the real-world light source as a virtual light source having a type, position, color, intensity, and size;
providing at least a portion of a look-up table (LUT) of virtual light sources comprising type, position, color, intensity, and size to a rendering engine using an Application Programming Interface (API); and
rendering a three-dimensional overlay image for display by the HMD, at least in part, using the portion of the LUT.

12. The method of claim 11, further comprising classifying the real-world light source as: point, spot, directional, or area.

13. The method of claim 11, further comprising:
detecting movement of the real-world light source;
simulating a corresponding movement of the virtual light source; and
updating an illumination of the overlay image according to the movement.

14. The method of claim 11, further comprising:
detecting a change in intensity of the real-world light source;
simulating a corresponding change of intensity of the virtual light source; and
updating an illumination of the overlay image according to the change in intensity.

15. The method of claim 11, further comprising:
detecting a change in color of the real-world light source;
simulating a corresponding change of color of the virtual light source; and
updating an illumination of the overlay image according to the change in color.

16. A hardware memory of a Head-Mounted Device (HMD), the hardware memory having program instructions stored thereon that, upon execution by a processor, cause the HMD to:
capture an image of a real-world light source during execution of an augmented reality (AR) application using a sensor mounted on a Head-Mounted Device (HMD);
provide the image to an Information Handling System (IHS) coupled to the HMD, wherein the IHS is configured to: (a) identify a property of the real-world light source, at least in part, using at least a portion of a look-up table (LUT) of virtual light sources comprising type, position, color, intensity, and size using an Application Programming Interface (API), and (b) illuminate or shade an image rendered using the property;
receive the rendered image from the IHS; and
display the rendered image.

17. The hardware memory of claim 16, wherein to illuminate or shade the image rendered using the property, the IHS is further configured to transform a real-world location of the real-world light source to another location in a coordinate system used by the AR application.

* * * * *